(12) United States Patent
Uzawa et al.

(10) Patent No.: US 7,465,350 B2
(45) Date of Patent: Dec. 16, 2008

(54) HYDRAULIC COMPOSITION

(75) Inventors: Masami Uzawa, Sakura (JP); Tetsuro Hyodo, Saitama (JP)

(73) Assignee: Taiheiyo Cement Corporation, Tokyo (JP)

( * ) Notice: Subject to any disclaimer, the term of this patent is extended or adjusted under 35 U.S.C. 154(b) by 14 days.

(21) Appl. No.: 10/478,853

(22) PCT Filed: May 29, 2002

(86) PCT No.: PCT/JP02/05180

§ 371 (c)(1),
(2), (4) Date: Jul. 27, 2004

(87) PCT Pub. No.: WO02/096825

PCT Pub. Date: Dec. 5, 2002

(65) Prior Publication Data

US 2004/0247846 A1 Dec. 9, 2004

(30) Foreign Application Priority Data

| May 29, 2001 | (JP) | ............................. 2001-161281 |
| May 29, 2001 | (JP) | ............................. 2001-161282 |
| May 29, 2001 | (JP) | ............................. 2001-161283 |
| May 29, 2001 | (JP) | ............................. 2001-161284 |

(51) Int. Cl.
*C04B 11/00* (2006.01)
*C04B 16/00* (2006.01)
*C04B 14/00* (2006.01)

(52) U.S. Cl. ........................ 106/640; 106/641; 106/642; 106/643; 106/644; 106/707; 106/714; 106/716; 106/717; 106/724; 106/737; 106/802; 106/814; 106/816; 106/817

(58) Field of Classification Search ................. 588/252; 428/105, 172, 219, 312.8, 294.4, 294, 312.4, 428/323, 332, 304.4, 364, 294.7, 401, 402, 428/297, 668, 292.1; 106/709, 664, 638, 106/713, 401, 707, 640, 641, 642, 643, 644, 106/816, 802, 714, 716, 717, 780, 790, 814, 106/724

See application file for complete search history.

(56) References Cited

U.S. PATENT DOCUMENTS 4,217,144 A * 8/1980 Mathieu ..................... 106/104
4,829,107 A * 5/1989 Kindt et al. ..................... 524/3
4,933,013 A * 6/1990 Sakai et al. .................. 106/707
5,732,363 A * 3/1998 Suzuki et al. .................. 588/4

FOREIGN PATENT DOCUMENTS

| JP | 6-17255 B2 | 3/1984 |
| JP | 59-18338 B2 | 4/1984 |
| JP | 60-59182 B2 | 12/1985 |
| JP | 3-131556 A | 6/1991 |
| JP | 5-270872 A | 10/1993 |
| JP | 5-310459 A | 11/1993 |
| JP | 6-157115 A | 6/1994 |
| JP | 8-239249 A | 9/1996 |
| JP | 9-500352 A | 1/1999 |
| JP | 11-35359 A | 2/1999 |
| JP | 11-43361 | 2/1999 |
| JP | 2-102152 A | 4/1999 |
| JP | 11-130508 A | 5/1999 |
| JP | 11-209163 A | 8/1999 |
| JP | 2000-7400 A | 1/2000 |
| JP | 2001-58863 | 3/2001 |
| JP | 2001-213661 A | 8/2001 |

OTHER PUBLICATIONS

Etsuro Sakai et al., "Transition of Chemical Admixtures in Concrete", Topic: Super AE Plasticizer/Summary 1, in Concrete Engineering, Jun. 1999, vol. 37, No. 6, pp. 4-7.
JIS (Japanese Industrial Standards) A 5308, "Ready-To-Mix Aggregates for Concrete", Appendix 1 (regulation), A5308, 1998, pp. 13-16.
JIS (Japanese Industrial Standards) A 1103, "Method of test for Amount of Material Passing Standard Sieve 75 μm in Aggregates", A1103, 1997, pp. 1-4.

* cited by examiner

*Primary Examiner*—Terrel Morris
*Assistant Examiner*—Camie S Thompson
(74) *Attorney, Agent, or Firm*—Posz Law Group, PLC; R. Eugene Varndell, Jr.

(57) ABSTRACT

A hydraulic composition of the present invention includes (A) 100 parts by weight of cement having a Blaine specific surface area of 2,500 to 5,000 $cm^2/g$, (B) 10 to 40 parts by weight of fine particles having a BET specific surface area of 5 to 25 $m^2/g$, and (C) 15 to 55 parts by weight of inorganic particles having a Blaine specific surface area which is 2,500 to 30,000 $cm^2/g$ and which is larger than that of the cement. The inorganic particles (C) may comprise 10 to 50 parts by weight of inorganic particles (C1) having a Blaine specific surface area of 5,000 to 30,000 $cm^2/g$ and 5 to 35 parts by weight of inorganic particles (C2) having a Blaine specific surface area of 2,500 to 5,000 $cm^2/g$.

10 Claims, No Drawings

HYDRAULIC COMPOSITION

TECHNICAL FIELD

The present invention relates to a hydraulic composition, which has a self-filling property (i.e. excellent fluidity and material separation resistance) and is excellent in workability before hardening and which has excellent mechanical properties (i.e. compressive strength, bending strength and the like) after hardening.

BACKGROUND OF ART

Conventionally, cement-based materials (i.e. concrete and the like) having excellent mechanical properties (i.e. compressive strength, bending strength and the like) have been developed.

For example, in the "Claims" of Japanese Patent Publication No. 59182/1985, a hydraulic composite material which includes "inorganic solid particles A" having a diameter of 50 Å to 0.5 µm (for example, silica dust particles), "solid particles B" having a diameter which is 0.5 to 100 µm and which is larger than that of "particles A" at least by one order (for example, particles including at least 20 weight % of portland cement), a surface-activating dispersant (for example, a concrete superplasticizer such as a highly condensed naphthalene sulfonic acid/formaldehyde condensate), and an "additional material C" (for example, at least one selected from the group consisting of sand, stone, metallic fibers and the like).

The hydraulic composite material described in this gazette has compressive strength of at least 100 MPa after hardening and has excellent mechanical properties (see Table 1 in the sixty-third column in page 32 of the gazette).

Generally, a cement composition (for example, concrete and the like) having excellent mechanical properties (i.e. compressive strength, bending strength and the like) as described in the above-mentioned gazette has the following advantages.

(a) When a building or the like is constructed by using the cement composition having excellent mechanical properties in a method of cast-in-place, concrete layers can be thin. Thus the reduction of the amount of concrete, the saving of labor, the cost reduction, the increase of available space and the like can be achieved.

(b) When a precast member is produced by using the cement composition having excellent mechanical properties, the precast member can be thin. Thus the weight reduction, the easiness of transportation and construction, and the like can be achieved.

(c) Wear resistance, durability against neutralization or creeping, and the like can be improved.

The hydraulic composite material described in the above-mentioned Japanese Patent Publication No. 59182/1985 can be preferably used in view of the advantages (a)-(c).

However, it is further desired that a self-filling property is achieved in addition to the properties of the hydraulic composite material described in the above-mentioned gazette.

Namely, when a building or the like is constructed in a method of cast-in-place, or when a precast member is produced, it is advantageous that a hydraulic composite material having excellent fluidity and material separation resistance (namely, a hydraulic composite material having a self-filling property) is used in view of the reduction of the time required for casting a hydraulic composition such as concrete and the like, and the reduction of the time required for applying vibration to the concrete or the like after casting.

On this point, it is difficult to improve both the properties before hardening such as fluidity and material separation resistance, and the mechanical properties after hardening such as compressive strength, bending strength and the like simultaneously with regard to the hydraulic composite material disclosed in the above-mentioned Japanese Patent Publication No. 59182/1985. For example, when compressive strength over 130 MPa is desired, or when fibers are blended for improving bending strength, the ratio of water/binding material must be no larger than 0.20. Thus the fluidity lowers, and a self-filling property cannot be achieved. On the other hand, when a self-filling property is attempted to be obtained, the ratio of water/binding material, and the amount of a water reducing agent increase so greatly that it is difficult to express compressive strength over 130 MPa.

DISCLOSURE OF INVENTION

In view of the above-mentioned problems, the object of the present invention is to provide a hydraulic composition which is excellent in fluidity and material separation resistance and has a self-filling property before hardening, and which has excellent mechanical properties (i.e. compressive strength, bending strength and the like) such as compressive strength over 130 MPa after hardening.

In order to achieve the above object, a hydraulic composition of the present invention includes (A) 100 parts by weight of cement having a Blaine specific surface area of 2,500 to 5,000 $cm^2/g$, (B) 10 to 40 parts by weight of fine particles having a BET specific surface area of 5 to 25 $m^2/g$, (C) 15 to 55 parts by weight of inorganic particles having a Blaine specific surface area which is 2,500 to 30,000 $cm^2/g$ and which is larger than that of the cement, a water reducing agent, and water.

The hydraulic composition which is constructed as described above has a self-filling property (i.e. excellent fluidity and material separation resistance) and exhibits excellent workability before hardening, and expresses excellent mechanical properties (i.e. compressive strength, bending strength and the like) such as compressive strength over 130 MPa after hardening.

The hydraulic composition of the present invention includes an embodiment in which the inorganic particles (C) comprise 10 to 50 parts by weight of inorganic particles A (C1) having a Blaine specific surface area of 5,000 to 30,000 $cm^2/g$, and 5 to 35 parts by weight of inorganic particles B (C2) having a Blaine specific surface area of 2,500 to 5,000 $cm^2/g$. In this way, by using two kinds of inorganic particles having different Blaine specific surface areas, workability and a strength expressing property (the rate of strength gain) can be improved.

The hydraulic composition of the present invention includes an embodiment in which the inorganic particles (C1) have a Blaine specific surface area larger than those of the cement and the inorganic particles (C2), and the difference of Blaine specific surface area of the cement and the inorganic particles (C1) is at least 100 $cm^2/g$. In this way, workability and a strength expressing property can be further improved.

Also, the hydraulic composition of the present invention includes an embodiment in which the inorganic particles (C1) have a Blaine specific surface area larger than those of the cement particles and the inorganic particles (C2) by at least 1,000 $cm^2/g$. In this way, workability and a strength expressing property can be further improved.

The hydraulic composition of the present invention may include aggregates (D) having a particle size of no larger than 2 mm in an amount of no larger than 130 parts by weight.

It is preferable that the aggregates (D) include particles having a particle size of no larger than 75 μm in an amount of no larger than 2.0 weight %. In this way, workability and a strength expressing property can be further improved.

The hydraulic composition of the present invention may further include metallic fibers. Properties such as bending strength and the like can be improved by blending metallic fibers.

The hydraulic composition of the present invention may further include organic fibers and/or carbon fibers. Properties such as fracture energy and the like can be improved by blending organic fibers and/or carbon fibers.

The hydraulic composition of the present invention may be prepared so as to have a flow value of at least 230 mm before hardening, and have compressive strength of at least 130 MPa and bending strength of at least 15 MPa after hardening.

Also, the hydraulic composition of the present invention may be prepared so as to have fracture energy of at least 10 KJ/$m^2$ after hardening. In order to express such large fracture energy, it is effective that the organic fibers and/or carbon fibers as described above are blended.

BEST MODE FOR CARRYING OUT THE INVENTION

The present invention will be explained in more detail in the following description.

Examples of the cement (A) used in the present invention include various kinds of portland cements such as ordinary portland cement, high-early-strength portland cement, moderate-heat portland cement, and low-heat portland cement.

In the present invention, when high rate of strength gain in the early stage is desired, it is preferable to use high-early-strength portland cement. Also, when high fluidity of the hydraulic composition is desired, it is preferable to use moderate-heat portland cement or low-heat portland cement.

The Blaine specific surface area of the cement is 2,500 to 5,000 $cm^2$/g, preferably 3,000 to 4,500 $cm^2$/g. When the value is less than 2,500 $cm^2$/g, the hydration reaction becomes inactive, resulting in that compressive strength over 130 MPa may be difficult to obtain, and other disadvantages may occur. If the value is over 5,000 $cm^2$/g, it takes a lot of time to grind the cement. Also, the degree of shrinkage after hardening increases, because a large amount of water is necessary for obtaining predetermined degree of fluidity. Further, other disadvantages may occur.

Examples of the fine particles (B) used in the present invention include silica fume, silica dust, fly ash, slag, volcanic ash, silica sol, precipitated silica and the like.

Generally, silica fume and silica dust are preferably used as the fine particles (B) of the present invention, because each of them has a BET specific surface area of 5 to 25 $m^2$/g, and do not have the necessity of grinding and the like.

The BET specific surface area of the fine particles (B) is 5 to 25 $m^2$/g, preferably 8 to 25 $m^2$/g. When the value is less than 5 $m^2$/g, compressive strength over 130 MPa may be difficult to obtain due to the lack of compactness of the particles of the hydraulic composition. Also, other disadvantages may occur. When the value is over 25 $m^2$/g, compressive strength over 130 MPa may be difficult to obtain, because a large amount of water is necessary for obtaining predetermined degree of fluidity. Further, other disadvantages may occur.

The amount of the fine particles (B) is 10 to 40 parts by weight, preferably 25 to 40 parts by weight based on 100 parts by weight of the cement. If the amount does not lie within 10 to 40 parts by weight, fluidity extremely lowers.

The inorganic particles (C) used in the present invention is inorganic particles except cement particles, and the examples of the inorganic particles (C) include slag, limestone powder, feldspar, mullite, alumina powder, quartz powder, fly ash, volcanic ash, silica sol, carbide power, nitride power, and the like. Among them, slag, limestone powder and quartz powder are preferably used in view of cost and the stability of quality after hardening.

The Blaine specific surface area of the inorganic particles (C) is 2,500 to 30,000 $cm^2$/g, preferably 4,500 to 20,000 $cm^2$/g, and is larger than that of the cement particles.

When the Blaine specific surface area of the inorganic particles (C) is less than, 2,500 $cm^2$/g, it may be difficult to obtain a self-filling property, because the difference of Blaine specific surface area between the inorganic particles (C) and the cement may be small. Also, other disadvantages may occur. When the Blaine specific surface area of the inorganic particles (C) is larger than 30,000 $cm^2$/g, it may be difficult to produce the inorganic particles (C) due to much labor for grinding to be required for obtaining such a small fineness. Also, it may be difficult to obtain predetermined degree of fluidity. Further, other disadvantages may occur.

Because the inorganic particles (C) have a Blaine specific surface area larger than that of the cement, the particle size of the inorganic particles (C) is small enough to fill pore spaces between the cement particles and the fine particles. Thus, excellent properties including a self-filling property can be obtained.

The difference of Blaine specific surface area between the inorganic particles (C) and the cement is preferably not less than 1,000 $cm^2$/g and more preferably not less than 2,000 $cm^2$/g in view of workability (i.e. easiness of casting and the like) before hardening and a strength expressing property after hardening.

The amount of the inorganic particles (C) based on 100 parts by weight of the cement is 15 to 55 parts by weight, preferably 20 to 50 parts by weight. When the amount does not lie within 15 to 55 parts by weight, workability extremely lowers.

In the present invention, the inorganic particles (C) may comprise two kinds of inorganic particles, namely, inorganic particles (C1) and inorganic particles (C2).

In this case, inorganic particles (C1) and inorganic particles (C2) can be prepared from the same material (for example, limestone powder), or can be prepared from different kinds of materials (for example, limestone powder and quartz powder).

The inorganic particles (C1) have a Blaine specific surface area of 5,000 to 30,000 $cm^2$/g, preferably 6,000 to 20,000 $cm^2$/g. Also, the inorganic particles (C1) have a Blaine specific surface area larger than those of the cement and the inorganic particles (C2).

When the Blaine specific surface area of the inorganic particles (C1) is less than 5,000 $cm^2$/g, the difference between the Blaine specific surfaces area of the inorganic particles (C1) and those of the cement and the inorganic particles (C2) is small, and undesirable results occur. For example, the effect of improving workability and the like may be small compared to the effect obtained by using a single kind of inorganic particle. Also, preparing for two kinds of inorganic particles takes much time and labor, and this is undesirable. When the Blaine specific surface area of the inorganic particles (C1) is larger than 30,000 $cm^2$/g, it may be difficult to prepare the inorganic particles (C1), because it takes much time and labor for grinding. Also, high fluidity may be difficult to obtain.

Further, other disadvantages may occur.

Also, because the inorganic particles (C1) have a Blaine specific surface area larger than those of the cement and the inorganic particles (C2), the particle size of the inorganic particles (C1) is small enough to fill pore spaces between the cement and the fine particles (B). Thus, more excellent properties such as a self-filling property can be obtained.

The difference between the Blaine specific surface area of the inorganic particles (C1) and that of the cement or the inorganic particles (C2) (in other words, the difference between the Blaine specific surface area of the inorganic particles (C1) and the larger one selected from the Blaine specific surface area of the cement and that of the inorganic particles (C2)) is preferably not less than 1,000 $cm^2/g$, more preferably not less than 2,000 $cm^2/g$, in view of workability (easiness of casting and the like) before hardening and a strength expressing property after hardening The Blaine specific surface area of the inorganic particles (C2) is 2,500 to 5,000 $cm^2/g$. Also, the difference of Blaine specific surface area between the cement and the inorganic particles (C2) is preferably not less than 100 $cm^2/g$, more preferably not less than 200 $cm^2/g$ in view of workability (easiness of casting and the like) before hardening and a strength expressing property after hardening.

When the Blaine specific surface area of the inorganic particles (C2) is less than 2,500 $cm^2/g$, it may be difficult to obtain a self-filling property due to low fluidity, and other disadvantages may occur. When the Blaine specific surface area of the inorganic particles (C2) is larger than 5,000 $cm^2/g$, the Blaine specific surface area of the inorganic particles (C2) is so close to that of the inorganic particles (C1) that the effect of improving workability and the like may not increase compared to that obtained by using a single kind of inorganic particle. Also, preparing for two kinds of inorganic particles takes much time and labor. Further, other disadvantages may occur.

Also, when the difference of Blaine specific surface area between the cement and the inorganic particles (C2) is not less than 100 $cm^2/g$, the compactness of the particles of the hydraulic composition improves, and more excellent properties such as a self-filling property can be obtained.

The amount of the inorganic particles (C1) based on 100 parts by weight of the cement is 10 to 50 parts by weight, preferably 15 to 40 parts by weight. The amount of the inorganic particles (C2) based on 100 parts by weight of the cement is 5 to 35 parts by weight, preferably 10 to 30 parts by weight. When the amount of the inorganic particles (C1) or the inorganic particles (C2) does not lie within the above ranges, the effect of improving workability and the like may not increase compared to that obtained by using a single kind of inorganic particles. Also, preparing for two kinds of inorganic particles takes much time and labor. These are undesirable.

The total amount of the inorganic particles (C1) and the inorganic particles (C2) based on 100 parts by weight of the cement is 15 to 55 parts by weight, preferably 25 to 50 parts by weight. When the total amount does not lie within 15 to 55 parts by weight, workability extremely lowers.

Examples of the aggregates (D) used in the present invention include river sand, land sand, sea sand, crushed sand, silica sand, the mixture thereof, and the like.

It is preferable to use aggregates (D) having a particle diameter of no larger than 2 mm. Here, the term "particle diameter" of the aggregates means the 85% weight cumulative particle diameter. It is not preferable that the particle diameter of the aggregates is larger than 2 mm, because mechanical properties after hardening deteriorate.

Also, it is preferable to use aggregates (D) having a particle size of no larger than 75 μm in an amount of no larger than 2 weight %. It is not preferable that the amount is larger than 2 weight %, because fluidity and workability after hardening extremely deteriorate.

The maximum particle diameter of the aggregates used in the present invention is preferably not larger than 2 mm, and more preferably not larger than 1.5 mm in view of strength expressing property after hardening. Also, in view of fluidity and workability, it is more preferable to use aggregates having a diameter of no larger than 75 μm in an amount of no larger than 1.5 weight %.

The amount of the aggregates based on 100 parts by weight of the total amount of the cement, the fine particles and the inorganic particles is preferably not larger than 130 parts by weight in view of workability and mechanical strength after hardening. In view of reduction of autogenous and drying shrinkage, and reduction of heat of hydration, the amount of the aggregates is more preferably 30 to 130 parts by weight, and most preferably 40 to 130 parts by weight The hydraulic composition of the present invention may include metallic fibers' in view of improvement of bending strength and the like after hardening.

Examples of the metallic fibers include steel fibers, stainless fibers, amorphous fibers and the like. Among them, steel fibers are preferably used in view of strength, cost and availability. It is preferable that the metallic fibers have a diameter of 0.01 to 1.0 mm and a length of 2 to 30 mm, and it is more preferable that metallic fibers have a diameter of 0.05 to 0.5 mm and a length of 5 to 25 mm in view of prevention of material separation in the hydraulic composition and improvement of bending strength after hardening. Also, the aspect ratio (fiber length/fiber diameter) of the metallic fibers is preferably 20 to 200, and more preferably 40 to 150.

It is preferable that the metallic fibers have a shape such as a spiral shape, a wavelike shape and the like which is capable of creating physical adhesive force. The metallic fibers having a shape such as a spiral shape and the like have an effect of improving bending strength, because high stress can be maintained while the metallic fibers and matrix are pulled apart from each other.

Preferable examples of the metallic fibers include steel fibers which have a diameter of no larger than 0.5 mm and tensile strength of 1 to 3.5 GPa, and which have surface adhesive strength to a hardened cement composition such as mortar (i.e. maximum tensile force per unit area of the surface between the steel fibers and the hardened cement composition) of at least 3 MPa, provided that the hardened cement composition has compressive strength of 180 MPa. In this embodiment, the metallic fiber can be formed in a wavelike shape or a spiral shape. Also, the metallic fiber can have grooves or projections for acting against movement from matrix (i.e. resistance to sliding in longitudinal direction). Also, in this embodiment, the metallic fiber may have a metal layer on its surface (for example, a metal layer made of at least one material selected from the group consisting of zinc, tin, copper, aluminum and the like), whose Young's modulus is smaller than that of the steel fiber.

The amount of the metallic fibers to be blended, which is designated as volume percentage in the hydraulic composition (for example, a composition comprising the cement, the fine particles, the inorganic particles, the aggregates, the metallic fibers, water reducing agent and water) is preferably not larger than 4%, more preferably 0.5 to 3%, most preferably 1 to 3%. It is not preferable that the amount is larger than 4% for the following reasons. One reason is that it is necessary to increase unit water volume for obtaining excellent workability and the like while mixing. Other reason is that the reinforcing effect of the metallic fibers does not increase enough to commensurate with increased cost of the metallic fibers. Other reason is that there is a tendency that fiber balls are easy to generate in the hydraulic composition while mixing.

The hydraulic composition of the present invention may include organic fibers and/or carbon fibers in view of improvement of fracture energy and the like after hardening.

Examples of the organic fibers used in the present invention include vinylon fibers, polypropylene fibers, polyethylene fibers, aramid fibers and the like. Examples of the carbon fibers include PAN carbon fibers and pitch carbon fibers. Among the examples of the organic fibers, vinylon fibers and/or polypropylene fibers are preferably used in view of cost and availability.

It is preferable that the organic fibers and/or the carbon fibers have a diameter of 0.005 to 1.0 mm and a length of 2 to 30 mm, and it is more preferable that the organic fibers and/or carbon fibers have a diameter of 0.01 to 0.5 mm and a length of 5 to 25 mm in view of prevention of material separation in the hydraulic composition and improvement of fracture energy after hardening. Also, the aspect ratio (fiber length/fiber diameter) of the organic fibers and/or the carbon fibers is preferably 20 to 200, and more preferably 30 to 150.

The amount of the organic fibers and/or the carbon fibers to be blended, which is designated as volume percentage in the hydraulic composition (for example, a composition comprising the cement, the fine particles, the inorganic particles, the aggregates, the organic fibers and/or the carbon fibers, a water reducing agent and water) is preferably 0.1 to 10.0, %, more preferably 1.0 to 9.0%, and most preferably 2.0 to 8.0%. It is not preferable that the amount is less than 0.1%, because the organic fibers and/or the carbon fibers may not improve fracture energy after hardening sufficiently, and it may be difficult to obtain fracture energy of at least 10.0 KJ/m$^2$. It is not preferable that the amount is larger than 10.0% for the following reasons. One reason is that it is necessary to increase unit water volume for obtaining excellent workability and the like while mixing. Other reason is that the reinforcing effect of the organic fibers and/or the carbon fibers does not increase enough to commensurate with increased cost of the organic fibers and/or the carbon fibers. Other reason is that there is a tendency that fiber balls are easy to generate in the hydraulic composition while mixing.

The metallic fibers, and the organic fibers and/or the carbon fibers can be used together.

In preparation of paste or mortar, a water reducing agent and water are blended into the above-described materials.

Examples of the water reducing agent include water reducing agents, air entraining water reducing agents, high range water reducing agents, and air entraining and high range water reducing agents. Examples of effective components of these water reducing agents include lignin derivatives, naphthalene sulfonic acid derivatives, melamine derivatives, polycarboxylic acid derivatives. Among the above-mentioned examples, high range water reducing agents, and air entraining and high range water reducing agents are preferably used in view of high water reducing effect. Especially, high range water reducing agents, and air entraining and high range water reducing agents, which contain polycarboxylic acid derivatives, are most preferably used.

The amount of the water reducing agent, which is expressed in terms of solid content, based on 100 parts by weight of the total amount of the materials (i.e. the cement, the fine particles and the inorganic particles) is preferably 0.1 to 4.0 parts by weight, and more preferably 0.3 to 2.0 parts by weight. When the amount is less than 0.1 parts by weight, it may be difficult to mix the hydraulic composition, and fluidity may be not high enough to obtain a self-filling property. When the amount is larger than 4.0 parts by weight, material separation and extreme retardation of coagulation may occur, and mechanical properties after hardening may deteriorate.

The water reducing agent can be used in liquid state as well as in powdery state.

The amount of water for preparing paste or mortar based on 100 parts by weight of the total amount of the materials (i.e. the cement, the fine particles and the inorganic particles) is preferably 10 to 30 parts by weight, and more preferably 12 to parts by weight. When the amount of water is less than 10 parts by weight, it may be difficult to mix the hydraulic composition, and fluidity may be not high enough to obtain a self-filling property. When the amount of water is larger than parts by weight, mechanical properties after hardening may deteriorate.

The flow value of paste or mortar before hardening is preferably not less than 230 mm, and more preferably not less than 240 mm.

Also, when the inorganic particles (C1) and the inorganic particles (C2) are used together as the inorganic particles (C), the flow value of paste or mortar before hardening is preferably not less than 240 mm, and more preferably not less than 250 mm. Particularly, when the aggregates include particles having a diameter of no larger than 75 μm in an amount of no larger than 2.0 weight %, the flow value is preferably not less than 250 mm, more preferably not less than 265 mm, and most preferably not less than 280 mm. In this description, the term "flow value" means a value to be determined by the method according to "JIS R 5201 (Physical Testing Methods for Cements) 11. Flow Test" in which 15-times dropping motion is omitted.

Also, in the above-mentioned flow test, the time required for reaching 200 mm with regard to flow value is preferably not larger than 10.5 seconds, and more preferably not larger than 10.0 seconds. This value is used as a measure for evaluating workability and viscosity.

Compressive strength of paste or mortar after hardening is preferably not less than 130 MPa, and more preferably not less than 140 MPa.

Bending strength of paste or mortar after hardening is preferably not less than 15 MPa, more preferably not less than 18 MPa, and most preferably not less than 20 MPa. Particularly, when the hydraulic composition includes the metallic fibers, bending strength of mortar after hardening is preferably not less than 30 MPa, more preferably not less than 32 MPa, and most preferably not less than 35 MPa.

Fracture energy of paste or mortar after hardening is preferably not less than 10 KJ/m$^2$, and more preferably not less than 20 KJ/m$^2$, provided that the organic fibers and/or the carbon fibers, or the metallic fibers are blended.

The method for mixing paste or mortar of the hydraulic composition of the present invention is not particularly limited. For example, one of the following methods can be adopted.

(a) A method where materials except water and the water reducing agent (i.e. the cement, the fine particles, the in organic particles and the aggregates) are blended for preparing a premixed material, and then the obtained premixed material, water and the water reducing agent are thrown into a mixer and mixed.

(b) A method where after preparing a powdery water reducing agent, materials except water (i.e. the cement, the fine particles, the inorganic particles, the aggregates, and the water reducing agent) are blended for preparing a premixed material, and then the obtained premixed material and water are thrown into a mixer and mixed.

(c) A method where each of all the materials is thrown into a mixer individually and mixed.

The mixer used for mixing may be any type of mixer used for mixing ordinary concrete. Examples of the mixer include a swing-type mixer, a pan-type mixer, a biaxial mixer, and the like. Also, the method for curing the hydraulic composition is note specially limited. Examples of the curing method include air curing, steam curing, and the like.

Hereinafter, the present invention will be explained by experimental Examples.

(A) Examples where One Kind of Inorganic Particles are Used, and the Metallic Fibers are Used or not Used

[1. Materials to be Used]

Following materials were used herein.

(1) Cement; A: Ordinary portland cement (manufactured by TAIHEIYO CEMENT Corp.; Blaine specific surface area: 3,300 cm$^2$/g)

Cement; B: Low-heat portland cement (manufactured by TAIHEIYO CEMENT Corp.; Blaine specific surface area: 3,200 cm$^2$/g)

(2) Fine Particles; A: Silica fume (BET specific surface area: 10 m$^2$/g).

Fine Particles; B: Silica fume (BET specific surface area: 22 m$^2$/g)

(3) Inorganic particles; Slag powder A (Blaine specific surface area: 4,500 cm$^2$/g)

Slag powder B (Blaine specific surface area: 15,000 cm$^2$/g)

Quartz powder (Blaine specific surface area: 7,500 cm$^2$/g)

Limestone powder (Blaine specific surface area: 8,000 cm$^2$/g)

(4) Aggregates; Sand A (Silica sand; Maximum diameter: 0.6 mm, The amount of particles having a diameter of no larger than 75 μm: 0.3 weight %)

Sand B (Silica sand; Maximum diameter: 0.6 mm, The amount of particles having a diameter of no larger than 75 um: 1.5 weight %)

Sand C (Diameter: 3.5 mm, Maximum diameter: 4.0 mm)

(5) Metallic fibers; Steel fibers (Diameter: 0.2 mm, Length: 13 mm)

(6) Organic fibers; Vinylon fibers (Diameter: 0.3 mm, Length: 13 mm)

(7) Water reducing agent; Air entraining and high range water reducing agent which contains polycarboxylic acid derivatives (8) Water; Tap Water The amounts of the above materials to be blended in Examples 1-21 and Comparative Examples 1-5 are shown in Table 1.

TABLE 1

| | cement | | fine particles | | inorganic particles | | | | sand | | | water reducing | | metallic | organic |
|---|---|---|---|---|---|---|---|---|---|---|---|---|---|---|---|
| | A | B | A | B | slag A | slag B | quartz | limestone | A | B | C | agent *1 | water | fibers *2 | fibers *3 |
| Examples | | | | | | | | | | | | | | | |
| 1 | | 100 | 25 | | 30 | | | | 115 | | | 0.9 | 25 | 4 | |
| 2 | 100 | | 28 | | 36 | | | | | 126 | | 1.2 | 27 | 4 | |
| 3 | | 100 | 23 | | 26 | | | | | 104 | | 0.8 | 23 | 4 | |
| 4 | 100 | | 30 | | 26 | | | | 110 | | | 1.2 | 23 | 3 | |
| 5 | | 100 | 31.5 | | 28 | | | | 106 | | | 0.9 | 22 | 4 | |
| 6 | 100 | | 26 | | | 20 | | | 106 | | | 1.1 | 26 | 4 | |
| 7 | | 100 | 30 | | | 25 | | | 120 | | | 1.0 | 25 | 4 | |
| 8 | 100 | | 28 | | | | | 39 | | 104 | | 1.2 | 26 | 4 | |
| 9 | | 100 | | 20 | | | | 30 | | 120 | | 0.8 | 23 | 4 | |
| 10 | | 100 | | 20 | | | | 23 | 110 | | | 0.9 | 22 | 4 | |
| 11 | 100 | | 35 | | | | | 32 | | 105 | | 1.2 | 26 | 4 | |
| 12 | 100 | | 31.5 | | | | 28 | | 106 | | | 1.0 | 24 | 2 | |
| 13 | 100 | | | 20 | | | 30 | | 120 | | | 1.2 | 26 | 4 | |
| 14 | 100 | | | 30 | | | 23 | | 110 | | | 1.6 | 28 | 4 | |
| 15 | | 100 | 30 | | | | 39 | | 104 | | | 0.6 | 22 | | |
| 16 | | 100 | 30 | | | | 39 | | 104 | | | 0.6 | 22 | 2 | |
| 17 | | 100 | 23 | | | | 39 | | 103 | | | 0.9 | 23 | 2 | |
| 18 | | 100 | 30 | | | | 39 | | | 104 | | 1.2 | 23 | 2 | |
| 19 | | 100 | 30 | | | | 39 | | 104 | | | 0.3 | 26 | 2 | |
| 20 | | 100 | 25 | | | | 26 | | 104 | | | 0.5 | 26 | 4 | |
| 21 | | 100 | 23 | | | | 39 | | 103 | | | 0.9 | 23 | 2 | 2 |
| Comparative Examples | | | | | | | | | | | | | | | |
| 1 | 100 | | | | 42 | | | | 110 | | | 1.2 | 26 | 4 | |
| 2 | 100 | | 28 | | 60 | | | | 105 | | | 0.9 | 25 | 4 | |
| 3 | | 100 | 15 | | | | | | 100 | | | 1.0 | 24.5 | 2 | |
| 4 | | 100 | 15 | | | | | | 100 | | | 1.0 | 24.5 | | |
| 5 | | 100 | 23 | | | | 39 | | | | 103 | 0.9 | 23 | 2 | |

*1 The amount of a water reducing agent is expressed in terms of solid content.
*2 The amount of metallic fibers is shown as volume % in a mixed material.
*3 The amount of organic fibers is shown as volume % in a mixed material.

[2. Preparation and Evaluation of Mortar]

Each of the materials was thrown into a biaxial mixer individually. After mixing, physical properties both before hardening and after hardening were measured and evaluated as follows.

(1) Flow Value

Flow value was determined by the method prescribed in "JIS R 5201 (Physical Testing Methods for Cements) 11. Flow Test" where 15-times dropping motion is omitted.

(2) 200 mm Reaching Time

In the above-mentioned Flow Test, the time for reaching 200 mm with regard to flow value was measured.

(3) Compressive Strength

Each of the mixed materials was flown into a mold having a size of Φ50×100 mm and was kept at 20° C. for 48 hours. After that, each of the materials was steam-cured at 90° C. for 48 hours for making hardened bodies (three pieces). Then, compressive strength of each of the three hardened bodies was measured by the method prescribed in "JIS A 1108 (Compressive Strength Testing Method for Concrete)". The values of compressive strength shown in Tables described below are the average values of the measured values (i.e. the average value of three pieces)

(4) Bending Strength

Each of the mixed materials was flown into a mold having a size of 4×4×16 cm and was kept at 20° C. for 48 hours. After that, the material was steam-cured at 90° C. for 48 hours for making hardened bodies (three pieces). Then, bending strength of each of the three hardened bodies was measured by the method prescribed in "JIS R5201 (Physical Testing Methods for Cements)". The loading test was done in a condition in which there were four-fulcrum points including two points having a space of 12 cm as lower fulcrums and two points having a space of 4 cm as upper fulcrums. The values of bending strength shown in Tables described below are the average values of the measured values (i.e. the average value of three pieces).

(5) Fracture Energy

Fracture energy was determined by dividing an integration value, which is a integrated value of load and load point displacement during the time that the load is lowered from the maximum load to ⅓ of the maximum load, by the cross section of the test piece. The value of "load point displacement" is a crosshead displacement value measured by a bending test machine.

The results are shown in Table 2.

TABLE 2

| | Flow Value (mm) | 200 mm Reaching Time (sec) | Compressive Strength (MPa) | Bending Strength (MPa) | Fracture Energy (KJ/m²) |
|---|---|---|---|---|---|
| Examples | | | | | |
| 1 | 258 | 9.5 | 220 | 43 | 63 |
| 2 | 256 | 9.4 | 210 | 45 | |
| 3 | 252 | 8.5 | 225 | 45 | |
| 4 | 256 | 8.6 | 210 | 46 | |
| 5 | 260 | 8.7 | 215 | 42 | |
| 6 | 255 | 8.6 | 216 | 43 | |
| 7 | 256 | 8.3 | 213 | 52 | |
| 8 | 256 | 9.3 | 215 | 43 | 61 |
| 9 | 257 | 8.8 | 217 | 43 | |
| 10 | 251 | 8.3 | 206 | 40 | |
| 11 | 256 | 7.9 | 208 | 42 | |
| 12 | 260 | 8.6 | 221 | 50 | |
| 13 | 257 | 8.3 | 215 | 56 | |
| 14 | 256 | 8.6 | 216 | 41 | |
| 15 | 255 | 9.5 | 230 | 26 | 2 |
| 16 | 255 | 9.6 | 235 | 45 | |
| 17 | 252 | 9.6 | 210 | 42 | 61 |
| 18 | 248 | 9.8 | 200 | 42 | |
| 19 | 265 | 9.5 | 190 | 35 | |
| 20 | 256 | 9.3 | 225 | 42 | |
| 21 | 250 | 9.9 | 185 | 41 | 59 |
| Comparative Examples | | | | | |
| 1 | 135 | — | 140 | 29 | |
| 2 | 190 | — | 198 | 30 | |
| 3 | 185 | — | 175 | 35 | |
| 4 | 200 | — | 170 | 24 | 2 |
| 5 | 255 | 6.9 | 195 | 35 | 48 |

As shown in Table 2, the hydraulic compositions (Examples 1-21) of the present invention have a self-filling property (i.e. good flow value and 200 mm reaching time) and excellent mechanical properties (i.e. compressive strength and bending strength). On the contrary, the hydraulic compositions of Comparative Examples 1-4 have low flow values and the like, and do not exhibit a self-filling property.

(B) Examples where Two Kinds of Inorganic Particles are Used, and the Metallic Fibers are Used or not Used.

[1. Materials to be Used]

Following materials were used.

(1) Cement; A: Ordinary portland cement (manufactured by TAIHEIYO CEMENT Corp.; Blaine specific surface area: 3,300 cm²/g)

Cement; B: Low-heat portland cement (manufactured by TAIHEIYO CEMENT Corp.; Blaine specific surface area: 3,200 cm²/g)

(2) Fine Particles; A: Silica fume (BET specific surface area: 1 m²/g),

Fine Particles; B: Silica fume (BET specific surface area: 21 m²/g)

(3) Inorganic particles (C1); Slag powder A (Blaine specific surface area: 6,000 cm²/g)

Slag powder B (Blaine specific surface area: 15,000 cm²/g)

Quartz powder (Blaine specific surface area: 8,000 cm²/g)

Limestone powder (Blaine specific surface area: 10,000 cm²/g)

(4) Inorganic particles (C2); Slag powder A (Blaine specific surface area: 4,500 cm²/g)

Quartz powder (Blaine specific surface area: 4,000 cm²/g)

Limestone powder A (Blaine specific surface area: 3,800 cm²/g)

Limestone powder B (Blaine specific surface area: 2,600 cm²/g)

(5) Aggregates; Silica sand A (Maximum diameter: 0.6 mm, The amount of particles having a diameter of no larger than 75 μm: 0.35 weight %)

Silica sand B (Maximum diameter: 0.6 mm, The amount of particles having a diameter of no larger than 7-5 μm: 1.2 weight %)

Silica sand C (Maximum diameter: 0.6 mm, The amount of particles having a diameter of no larger than 75 μm: 2.9 weight %)

(6) Metallic fibers; Steel fibers (Diameter: 0.2 mm, Length: 13 mm)

(7) Organic fibers; Vinylon fibers (Diameter: 0.3 mm, Length: 13 mm)

(8) Water reducing agent; Air entraining and high range water reducing agent which contains polycarboxylic acid derivatives (9) Water; Tap Water The amounts of the above materials to be blended in Examples 22-42 are shown in Table 3.

TABLE 3

| Examples | cement A | cement B | fine particles A | fine particles B | inorganic particles A slag A | inorganic particles A slag B | inorganic particles A quartz | inorganic particles A limestone | inorganic particles B slag | inorganic particles B quartz | inorganic particles B limestone A | inorganic particles B limestone B |
|---|---|---|---|---|---|---|---|---|---|---|---|---|
| 22 |  | 100 |  | 23 | 26 |  |  |  | 13 |  |  |  |
| 23 | 100 |  | 30 |  | 26 |  |  |  | 13 |  |  |  |
| 24 |  | 100 | 31.5 |  | 28 |  |  |  | 17 |  |  |  |
| 25 |  | 100 |  | 20 | 30 |  |  |  |  |  |  | 21 |
| 26 |  | 100 |  | 20 | 23 |  |  |  | 22 |  |  |  |
| 27 | 100 |  | 26 |  |  | 20 |  |  |  |  | 25 |  |
| 28 |  | 100 | 30 |  | 25 |  |  |  |  |  |  | 25 |
| 29 | 100 |  | 31.5 |  | 28 |  |  |  |  | 17 |  |  |
| 30 | 100 |  |  | 20 | 30 |  |  |  |  |  |  | 21 |
| 31 | 100 |  |  | 30 | 23 |  |  |  | 22 |  |  |  |
| 32 | 100 |  | 28 |  |  |  |  | 25 |  |  | 15 |  |
| 33 | 100 |  | 35 |  |  |  |  | 32 |  |  | 20 |  |
| 34 |  | 100 | 32.2 |  |  |  | 26 |  |  | 13 |  |  |
| 35 |  | 100 | 32.2 |  |  |  | 26 |  |  | 13 |  |  |
| 36 |  | 100 |  | 23 |  |  | 22 |  |  | 22 |  |  |
| 37 |  | 100 | 32.2 |  |  |  | 26 |  |  | 13 |  |  |
| 38 |  | 100 | 32.2 |  |  |  | 26 |  |  | 13 |  |  |
| 39 |  | 100 |  | 23 |  |  | 22 |  |  | 22 |  |  |
| 40 |  | 100 |  | 12.5 |  |  | 15 |  |  | 10 |  |  |
| 41 |  | 100 | 32.2 |  |  |  | 26 |  |  | 13 |  |  |
| 42 |  | 100 | 32.2 |  |  |  | 26 |  |  | 13 |  |  |

| Examples | silica sand A | silica sand B | silica sand C | water reducing agent *1 | water | metallic fibers *2 | organic fibers *3 |
|---|---|---|---|---|---|---|---|
| 22 |  | 110 |  | 0.8 | 23 | 4 |  |
| 23 | 106 |  |  | 0.8 | 22 | 3 |  |
| 24 | 120 |  |  | 0.9 | 22 | 4 |  |
| 25 |  | 110 |  | 0.8 | 22 | 4 |  |
| 26 |  | 105 |  | 0.8 | 25 | 4 |  |
| 27 | 120 |  |  | 1.1 | 27 | 4 |  |
| 28 | 106 |  |  | 1.0 | 25 | 4 |  |
| 29 | 120 |  |  | 1.0 | 24 | 2 |  |
| 30 | 120 |  |  | 1.2 | 26 | 4 |  |
| 31 | 110 |  |  | 1.6 | 28 | 3 |  |
| 32 |  | 104 |  | 1.1 | 23 | 4 |  |
| 33 | 106 |  |  | 1.2 | 25 | 4 |  |
| 34 |  |  | 104 | 1.5 | 22.7 |  |  |
| 35 | 104 |  |  | 0.8 | 22 |  |  |
| 36 | 104 |  |  | 0.9 | 23 |  |  |
| 37 |  |  | 104 | 1.5 | 22.7 | 2 |  |
| 38 | 104 |  |  | 0.8 | 22 | 2 |  |
| 39 | 104 |  |  | 0.9 | 23.5 | 2 |  |
| 40 |  |  |  | 0.5 | 22.5 |  |  |
| 41 | 104 |  |  | 0.3 | 26 | 2 |  |
| 42 | 104 |  |  | 0.8 | 22 | 2 | 2 |

*1 The amount of a water reducing agent is expressed in terms of solid content.
*2 The amount of metallic fibers is shown as volume % in a mixed material.
*3 The amount of organic fibers is shown as volume % in a mixed material.

[2. Preparation and Evaluation of Mortar and Paste]

Each of materials was thrown into a biaxial mixer individually and mixed. After mixing, the properties of the hydraulic composition both after hardening and before hardening were measured and evaluated in the same way as described above. The results are shown in Table 4.

TABLE 4

| Examples | Flow Value (mm) | 200 mm Reaching Time (sec) | Compressive Strength (MPa) | Bending Strength (MPa) | Fracture Energy (KJ/m²) |
|---|---|---|---|---|---|
| 22 | 282 | 7.9 | 220 | 47 | 65 |
| 23 | 272 | 8.3 | 198 | 37 | 52 |
| 24 | 280 | 7.6 | 230 | 35 |  |
| 25 | 283 | 7.8 | 225 | 40 |  |
| 26 | 275 | 8.1 | 210 | 46 |  |
| 27 | 272 | 8.0 | 220 | 40 |  |
| 28 | 285 | 9.2 | 215 | 32 |  |
| 29 | 270 | 8.9 | 220 | 38 |  |
| 30 | 276 | 8.2 | 240 | 36 |  |
| 31 | 275 | 8.3 | 220 | 49 |  |
| 32 | 270 | 8.8 | 215 | 35 |  |
| 33 | 270 | 8.2 | 215 | 45 | 64 |
| 34 | 260 | 9.3 | 230 | 28 |  |
| 35 | 295 | 7.5 | 230 | 29 | 2 |
| 36 | 285 | 8.7 | 215 | 27 |  |
| 37 | 257 | 9.5 | 230 | 44 |  |
| 38 | 295 | 7.7 | 230 | 44 | 63 |
| 39 | 285 | 8.5 | 205 | 43 | 63 |
| 40 | 275 | 8.9 | 218 | 27 |  |
| 41 | 285 | 8.3 | 190 | 35 |  |
| 42 | 268 | 9.5 | 185 | 40 | 57 |

As shown in Table 4, the hydraulic compositions (Examples 22-42) of the present invention have high fluidity, a self-filling property, and excellent mechanical strength (i.e. compressive strength, bending strength and the like).

Especially, the hydraulic compositions of Examples 22-33, 35-36 and 38-41, which include particles having a size of no larger than 75 μm in an amount of no larger than 2 weight %, have extremely excellent fluidity (i.e. flow value of at least 270 mm).

(C) Examples where a Single Kind of Inorganic Particles are Used, and the Organic Fibers and/or the Carbon Fibers are Used (5) Organic fibers; Vinylon fibers
  (Diameter: 0.3 mm, Length: 13 mm)
  Aramid fibers
  (Diameter: 0.3 Mm, Length: 13 Mm)
(6) Water reducing agent; Air entraining and high range water reducing agent which contains polycarboxylic acid derivatives
(7) Water; Tap Water The amounts of the above materials to be blended in Examples 43-62 are shown in Table 5.

TABLE 5

| Examples | cement A | cement B | fine particles A | fine particles B | slag A | slag B | quartz | limestone | silica sand A | silica sand B | silica sand C | water reducing agent *1 | water | organic fibers *2 vinylon | aramid |
|---|---|---|---|---|---|---|---|---|---|---|---|---|---|---|---|
| 43 |  | 100 | 25 |  | 30 |  |  |  | 115 |  |  | 0.9 | 25 | 4 |  |
| 44 | 100 |  | 28 |  | 36 |  |  |  |  | 126 |  | 1.2 | 27 | 4 |  |
| 45 |  | 100 | 23 |  | 26 |  |  |  |  | 104 |  | 0.8 | 23 | 4 |  |
| 46 | 100 |  | 30 |  | 26 |  |  |  |  | 110 |  | 1.2 | 23 | 3 |  |
| 47 |  | 100 | 31.5 |  | 28 |  |  |  |  | 106 |  | 0.9 | 22 | 4 |  |
| 48 | 100 |  | 26 |  |  | 20 |  |  | 106 |  |  | 1.1 | 26 | 4 |  |
| 49 |  | 100 | 30 |  |  | 25 |  |  | 120 |  |  | 1.0 | 25 | 4 |  |
| 50 | 100 |  | 28 |  |  |  |  | 39 |  | 104 |  | 1.2 | 26 | 4 |  |
| 51 |  | 100 |  | 20 |  |  |  | 30 | 120 |  |  | 0.8 | 23 |  | 3 |
| 52 |  | 100 |  | 20 |  |  |  | 23 |  | 110 |  | 0.9 | 22 | 8 |  |
| 53 | 100 |  | 35 |  |  |  |  | 32 | 105 |  |  | 1.2 | 26 | 4 |  |
| 54 | 100 |  | 31.5 |  |  |  |  | 28 | 106 |  |  | 1.0 | 24 | 2 |  |
| 55 | 100 |  |  | 20 |  |  |  | 30 | 120 |  |  | 1.2 | 26 | 4 |  |
| 56 | 100 |  |  | 30 |  |  |  | 23 | 110 |  |  | 1.6 | 28 | 7 |  |
| 57 |  | 100 | 30 |  |  |  | 39 |  | 104 |  |  | 0.6 | 22 |  | 4 |
| 58 |  | 100 | 30 |  |  |  | 39 |  | 104 |  |  | 0.6 | 22 | 4 |  |
| 59 |  | 100 |  | 23 |  |  | 39 |  | 103 |  |  | 0.9 | 23 | 4 |  |
| 60 |  | 100 | 30 |  |  |  | 39 |  |  | 104 |  | 1.2 | 23 | 4 |  |
| 61 |  | 100 | 30 |  |  |  | 39 |  | 104 |  |  | 0.3 | 26 | 4 |  |
| 62 |  | 100 |  |  |  |  |  | 26 | 104 |  |  | 0.5 | 26 | 4 |  |

*1 The amount of a water reducing agent is expressed in terms of solid content.
*2 The amount of organic fibers is shown as volume % in a mixed material.

[1. Materials to be Used]

Following materials were used.

(1) Cement; A: Ordinary portland cement (manufactured by TAIHEIYO CEMENT Corp.; Blaine specific surface area: 3,300 cm$^2$/g)
  Cement; B: Low-heat portland cement (manufactured by TAIHEIYO CEMENT Corp.; Blaine specific surface area: 3,200 cm$^2$/g)
(2) Fine Particles; A: Silica fume (BET specific surface area: 11 m$^2$/g),
  Fine Particles; B: Silica fume (BET specific surface area: 21 m$^2$/g)
(3) Inorganic particles; Slag powder A (Blaine specific surface area: 4,500 cm$^2$/g)
  Slag powder B (Blaine specific surface area: 15,000 cm$^2$/g)
  Limestone powder (Blaine specific surface area: 8,000 cm$^2$/g)
  Quartz powder (Blaine specific surface area: 7,500 cm$^2$/g)
(4) Aggregates; Silica sand A (Maximum diameter: 0.6 mm,
  The amount of particles having a diameter of no larger than 75 μm: 0.3 weight %)
  Silica sand B (Maximum diameter: 0.6 mm,
  The amount of particles having a diameter of no larger than 75 μm: 1.5 weight %)
  Silica sand C (Maximum diameter: 0.6 mm,
  The amount of particles having a diameter of no larger than 75 μm: 2.6 weight %)

[2. Preparation and Evaluation of Mortar]

Each of the materials was thrown into a biaxial mixer individually. After mixing, the properties of the hydraulic composition both after hardening and before hardening were measured and evaluated in the same way as described above. The results are shown in Table 6.

TABLE 6

| Examples | Flow Value (mm) | 200 mm Reaching Time (sec) | Compressive Strength (MPa) | Bending Strength (MPa) | Fracture Energy (KJ/m$^2$) |
|---|---|---|---|---|---|
| 43 | 268 | 9.3 | 155 | 21 | 31 |
| 44 | 256 | 9.2 | 156 | 27 | 32 |
| 45 | 254 | 9.8 | 154 | 24 | 32 |
| 46 | 265 | 8.9 | 168 | 22 | 34 |
| 47 | 267 | 8.6 | 159 | 21 | 32 |
| 48 | 250 | 9.2 | 153 | 26 | 32 |
| 49 | 256 | 9.3 | 150 | 23 | 33 |
| 50 | 266 | 8.8 | 152 | 25 | 33 |
| 51 | 255 | 9.6 | 152 | 23 | 35 |
| 52 | 260 | 9.3 | 131 | 25 | 36 |
| 53 | 251 | 9.6 | 152 | 24 | 34 |
| 54 | 264 | 9.4 | 174 | 22 | 31 |
| 55 | 252 | 9.3 | 151 | 22 | 30 |
| 56 | 258 | 9.6 | 135 | 25 | 32 |
| 57 | 252 | 9.5 | 151 | 28 | 35 |
| 58 | 252 | 9.6 | 155 | 25 | 34 |
| 59 | 250 | 9.7 | 150 | 27 | 32 |
| 60 | 245 | 9.8 | 148 | 26 | 35 |

TABLE 6-continued

| Examples | Flow Value (mm) | 200 mm Reaching Time (sec) | Compressive Strength (MPa) | Bending Strength (MPa) | Fracture Energy (KJ/m$^2$) |
|---|---|---|---|---|---|
| 61 | 263 | 9.2 | 141 | 25 | 36 |
| 62 | 266 | 9.2 | 151 | 23 | 30 |

As shown in Table 6, the hydraulic compositions (Examples 43-62) of the present invention have a self-filling property (good flow value and 200 mm reaching time) and excellent mechanical properties (i.e. compressive strength, bending strength and fracture energy).

(D) Examples where Two Kinds of Inorganic Particles are Used, and the Organic Fibers and/or the Carbon Fibers are Used

[1. Materials to be used]
Following materials were used.
(1) Cement; A: Ordinary portland cement (manufactured by TAIHEIYO CEMENT Corp.; Blaine specific surface area: 3,300 cm$^2$/g)
Cement; B: Low-heat portland cement (manufactured by TAIHEIYO CEMENT Corp.; Blaine specific surface area: 3,200 cm$^2$/g)
(2) Fine Particles; A: Silica fume (BET specific surface area: 11 m$^2$/g)
Fine Particles; B: Silica fume (BET specific surface area: 21 m$^2$/g)
(3) Inorganic particles (C1); Slag powder A (Blaine specific surface area: 6,000 cm$^2$/g)
Slag powder B (Blaine specific surface area: 15,000 cm$^2$/g)
Quartz powder (Blaine specific surface area: 8,000 cm$^2$/g)
Limestone powder (Blaine specific surface area: 10,000 cm$^2$/g)
(4) Inorganic particles (C2); Slag powder A (Blaine specific surface area: 4,500 cm$^2$/g)
Quartz powder (Blaine specific surface area: 4,000 cm$^2$/g)
Limestone powder A (Blaine specific surface area: 3,800 cm$^2$/g)
Limestone powder B (Blaine specific area: 2,600 cm$^2$/g)
(5) Aggregates; Silica sand A (Maximum diameter: 0.6 mm, The amount of particles having a diameter of no larger than 75 μm: 0.35 weight %)
Silica sand B (Maximum diameter: 0.6 mm, The amount of particles having a diameter of no larger than 75 μm: 1.2 weight %)
Silica sand C (Maximum diameter: 0.6 mm, The amount of particles having a diameter of no larger than 75 μm: 2.9 weight %)
(6) Organic fibers; Vinylon fibers
(Diameter: 0.3 mm, Length: 13 mm)
Aramid fibers
(Diameter: 0.25 Mm, Length: 15 Mm)
(7) Water reducing agent; Air entraining and high range water reducing agent which contains polycarboxylic acid derivatives
(8) Water; Tap Water The amounts of the above materials to be blended in Examples 63-82 are shown in Table 7.

TABLE 7

| | cement | | fine particles | | inorganic particles A | | | | inorganic particles B | | | |
|---|---|---|---|---|---|---|---|---|---|---|---|---|
| Examples | A | B | A | B | slag A | slag B | quartz | limestone | slag | quartz | limestone A | limestone B |
| 63 | | 100 | 25 | | 23 | | | | 30 | | | |
| 64 | 100 | | 28 | | 35 | | | | | | | 10 |
| 65 | | 100 | 23 | | 26 | | | | 13 | | | |
| 66 | 100 | | 30 | | 26 | | | | 13 | | | |
| 67 | | 100 | 31.5 | | 28 | | | | 17 | | | |
| 68 | | 100 | 20 | | 30 | | | | | | | 21 |
| 69 | | 100 | 20 | | 23 | | | | 22 | | | |
| 70 | 100 | | 26 | | | 20 | | | | | 25 | |
| 71 | | 100 | 30 | | 25 | | | | | | | 25 |
| 72 | 100 | | 31.5 | | 28 | | | | | 17 | | |
| 73 | 100 | | 20 | | 30 | | | | | | | 21 |
| 74 | 100 | | 30 | | 23 | | | | 22 | | | |
| 75 | 100 | | 28 | | | | 25 | | | | 15 | |
| 76 | 100 | | 35 | | | | 32 | | | | 20 | |
| 77 | | 100 | 32.2 | | | | 26 | | | 13 | | |
| 78 | | 100 | 32.2 | | | | 26 | | | 13 | | |
| 79 | | 100 | 32.2 | | | | 26 | | | 13 | | |
| 80 | | 100 | | 23 | | | 22 | | | 22 | | |
| 81 | | 100 | | 12.5 | | | 15 | | | 10 | | |
| 82 | | 100 | 32.2 | | | | 26 | | | 13 | | |

| | silica sand | | | | | organic fibers *2 | |
|---|---|---|---|---|---|---|---|
| Examples | A | B | C | water reducing agent *1 | water | vinylon | aramid |
| 63 | 126 | | | 0.9 | 25 | 4 | |
| 64 | | 104 | | 1.1 | 27 | 4 | |
| 65 | | 110 | | 1.2 | 23 | 4 | |
| 66 | 106 | | | 0.8 | 23 | 3 | |
| 67 | 120 | | | 0.9 | 24 | 4 | |
| 68 | 110 | | | 0.8 | 23 | | 3 |
| 69 | | 105 | | 1.2 | 25 | 8 | |
| 70 | 120 | | | 0.9 | 27 | 4 | |
| 71 | 106 | | | 0.8 | 25 | 4 | |
| 72 | 120 | | | 0.9 | 24 | 2 | |

TABLE 7-continued

| 73 | 120 |     |     | 0.9 | 26 | 4 |   |
|----|-----|-----|-----|-----|----|---|---|
| 74 | 110 |     |     | 0.9 | 24 | 7 |   |
| 75 |     | 104 |     | 1.1 | 26 | 4 |   |
| 76 | 106 |     |     | 0.9 | 25 | 4 |   |
| 77 | 104 |     |     | 0.8 | 22 |   | 4 |
| 78 |     |     | 104 | 1.5 | 23 | 4 |   |
| 79 | 104 |     |     | 0.8 | 22 | 4 |   |
| 80 | 104 |     |     | 0.9 | 24 | 4 |   |
| 81 |     |     |     | 0.5 | 23 | 4 |   |
| 82 | 104 |     |     | 0.3 | 26 | 4 |   |

*1 The amount of a water reducing agent is expressed in terms of solid content.
*2 The amount of organic fibers is shown as volume % in a mixed material.

[2. Preparation and Evaluation of Mortar and Paste]

Each of the materials was thrown into a biaxial mixer individually. After mixing, the properties of the hydraulic composition both after hardening and before hardening were measured and evaluated in the same way as described above. The results are shown in Table 8.

TABLE 8

| Examples | Flow Value (mm) | 200 mm Reaching Time (sec) | Compressive Strength (MPa) | Bending Strength (MPa) | Fracture Energy (KJ/m$^2$) |
|----------|-----------------|----------------------------|----------------------------|------------------------|-----------------------------|
| 63 | 282 | 7.3 | 159 | 23 | 30 |
| 64 | 273 | 9.3 | 152 | 21 | 31 |
| 65 | 283 | 7.6 | 159 | 27 | 30 |
| 66 | 270 | 8.5 | 153 | 26 | 26 |
| 67 | 279 | 7.5 | 153 | 28 | 35 |
| 68 | 280 | 7.9 | 156 | 29 | 32 |
| 69 | 276 | 8.1 | 140 | 29 | 36 |
| 70 | 273 | 8.2 | 159 | 23 | 33 |
| 71 | 285 | 7.9 | 149 | 23 | 30 |
| 72 | 271 | 7.9 | 149 | 22 | 36 |
| 73 | 275 | 7.6 | 150 | 23 | 32 |
| 74 | 273 | 7.6 | 150 | 23 | 33 |
| 75 | 271 | 8.9 | 156 | 21 | 32 |
| 76 | 271 | 8.0 | 156 | 28 | 32 |
| 77 | 291 | 7.5 | 157 | 28 | 31 |
| 78 | 255 | 9.7 | 160 | 28 | 30 |
| 79 | 292 | 7.7 | 158 | 25 | 35 |
| 80 | 283 | 8.5 | 141 | 27 | 32 |
| 81 | 272 | 9.0 | 149 | 25 | 30 |
| 82 | 281 | 8.0 | 140 | 24 | 29 |

As shown in Table 8, the hydraulic compositions of Examples 63-82 have high fluidity enough to have a self-filling property, and excellent mechanical strength (i.e. compressive strength, bending strength and fracture energy).

Especially, the hydraulic compositions of Examples 63-77 and 79-82, which include particles having a size of no larger than 75 μm in an amount of no larger than 2 weight %, have extremely excellent fluidity (i.e. flow value of at least 270 mm).

The invention claimed is:

1. A hydraulic composition which includes:
   (A) 100 parts by weight of cement having a Blaine specific surface area of 2,500 to 5,000 cm$^2$/g;
   (B) 10 to 40 parts by weight of fine particles having a BET specific surface area of 5 to 25 m$^2$/g;
   (C) 15 to 55 parts by weight of inorganic particles having a Blaine specific surface area which is 2,500 to 30,000 cm$^2$/g and the surface area of the inorganic particles is larger than that of the cement, the inorganic particles including 10 to 50 parts by weight of inorganic particles (C1) having a Blaine specific surface area of 5,000 to 30,000 cm$^2$/g, and 5 to 35 parts by weight of inorganic particles (C2) having a Blaine specific surface area of 2,500 to 5,000 cm$^2$/g;
   a water reducing agent; and
   water,
   wherein the inorganic particles (C1) have a Blaine specific surface area larger than those of the cement and the inorganic particles (C2), and the difference of Blaine specific surface area between the cement and the inorganic particles (C2) is not less than 100 cm$^2$/g.

2. The hydraulic composition according to claim 1, wherein the inorganic particles (C1) have a Blaine specific surface area larger than those of the cement particle and the inorganic particles B by 1,000 cm$^2$/g or more.

3. The hydraulic composition according to claim 1 which further includes aggregates D having a particle diameter of no larger than 2 nm in an amount of no larger than 130 parts by weight.

4. The hydraulic composition according to claim 1 which further includes metallic fibers.

5. The hydraulic composition according to claim 1 which includes organic fibers and/or carbon fibers.

6. The hydraulic composition according to claim 1, wherein the hydraulic composition has a flow value of no less than 230 mm before hardening, and has compressive strength of no less than 130 MPa and bending strength of no less than 15 MPa after hardening.

7. The hydraulic composition according to claim 1, which has fracture energy of no less than 10 KJ/m$^2$ after hardening.

8. The hydraulic composition according to claim 3, wherein no more than 2.0 weight % of the aggregates D include particles having a particle size of no larger than 75 μm.

9. The hydraulic composition according to claim 3, wherein the hydraulic composition has a flow value of no less than 230 mm before hardening, and has compressive strength of no less than 130 MPa and bending strength of no less than 15 MPa after hardening.

10. The hydraulic composition according to claim 3 which has fracture energy of no less than 10 KJ/m$^2$ after hardening.

* * * * *